United States Patent
Brotman et al.

(10) Patent No.: US 7,421,072 B2
(45) Date of Patent: Sep. 2, 2008

(54) LOCATION-BASED BRIDGING IN CALL CENTERS

(75) Inventors: Lynne Shapiro Brotman, Westfield, NJ (US); Yves D. Jean, New York, NY (US); Valentine C. Matula, Granville, OH (US); Michael J. Sammon, Watchung, NJ (US); Doree Duncan Seligmann, New York, NY (US)

(73) Assignee: Avaya Inc, Basking Ridge, NJ (US)

( * ) Notice: Subject to any disclaimer, the term of this patent is extended or adjusted under 35 U.S.C. 154(b) by 1064 days.

(21) Appl. No.: 10/265,068

(22) Filed: Oct. 4, 2002

(65) Prior Publication Data

US 2004/0202306 A1 Oct. 14, 2004

(51) Int. Cl.
*H04M 3/00* (2006.01)
*H04M 5/00* (2006.01)
*H04M 3/42* (2006.01)

(52) U.S. Cl. .......................... 379/265.01; 379/202.01; 379/203.01; 379/208.01; 379/265.03

(58) Field of Classification Search ............ 379/265.01, 379/265.02, 201.01, 265.03, 201.06, 202.01, 379/208.01, 203.01; 455/414.1, 422.1, 445, 455/428, 420, 456.3; 709/204
See application file for complete search history.

(56) References Cited

U.S. PATENT DOCUMENTS

| | | | | |
|---|---|---|---|---|
| 6,047,060 A | * | 4/2000 | Fedorov et al. | 379/265.02 |
| 6,073,013 A | * | 6/2000 | Agre et al. | 455/428 |
| 6,272,347 B1 | * | 8/2001 | Griffith et al. | 455/445 |
| 6,324,402 B1 | * | 11/2001 | Waugh et al. | 455/445 |
| 6,408,064 B1 | * | 6/2002 | Fedorov et al. | 379/265.06 |
| 6,519,628 B1 | * | 2/2003 | Locascio | 709/204 |
| 6,662,211 B1 | * | 12/2003 | Weller | 709/204 |
| 6,690,933 B1 | * | 2/2004 | Chapman et al. | 455/414.1 |
| 6,704,567 B1 | * | 3/2004 | Chapman et al. | 455/422.1 |
| 6,842,621 B2 | * | 1/2005 | Labun et al. | 455/456.3 |
| 6,987,846 B1 | * | 1/2006 | James | 379/201.06 |
| 7,031,700 B1 | * | 4/2006 | Weaver et al. | 455/420 |
| 2002/0097858 A1 | * | 7/2002 | Drobek et al. | 379/265.03 |
| 2005/0002510 A1 | * | 1/2005 | Elsey et al. | 379/201.01 |

* cited by examiner

*Primary Examiner*—Thjuan K Addy
(74) *Attorney, Agent, or Firm*—Demont & Breyer LLC

(57) ABSTRACT

A call center apparatus for automatically bridging a mobile user (e.g., a supervisor, etc.) into an existing conversation between a telephone operator and a caller is disclosed. The illustrative embodiments bridge the mobile user into the conversation of the closest telephone operator for which the mobile user has bridging authority.

11 Claims, 10 Drawing Sheets

US 7,421,072 B2

LOCATION-BASED BRIDGING IN CALL CENTERS

FIELD OF THE INVENTION

The present invention relates to telecommunications in general, and, in particular, to an apparatus in a call center for automatically bridging a mobile user into an existing conversation between a telephone operator and a caller based on the mobile user's proximity to each of the telephone operators.

BACKGROUND OF THE INVENTION

A call center is a central place where customer and other telephone calls are handled by an organization, usually with some amount of computer automation. Typically, a call center has the ability to handle a considerable volume of calls at the same time, to screen calls and forward them to someone qualified to handle them, and to log calls. Call centers are used by mail-order catalog organizations, telemarketing companies, computer product help desks, and any large organization that uses the telephone to sell or service products and services.

A call center typically comprises a plurality of human operators, each using a telephone to converse with a respective customer who has placed a call. When a caller places a call, the caller is automatically routed to an operator who is not currently engaged in a conversation with another caller. If all operators are busy, the caller is usually placed "on hold" and hears some variation of the following: "All operators are currently assisting other customers. Please stay on the line and the next available operator will take your call. Calls are answered in the order that they are received".

Call centers typically comprise one or more roaming human supervisors who might bridge into a conversation between an operator and a caller (i.e., the supervisor "gets on the line"). Scenario examples in which a supervisor might bridge into a conversation include:

the supervisor wishes to monitor the conduct of the operator;
 the supervisor listens to verify that a caller has authorized a particular action;
 the caller is frustrated with the operator and requests to speak with a supervisor.

A supervisor typically walks around the call center carrying a telephone headset and bridges into a conversation by walking to the corresponding operator's position and physically inserting a plug from the headset into a jack in the operator's telephone. Inserting the plug enables a three-way conversation between the supervisor, operator and caller, and removing the plug reverts to a two-way conversation between the operator and caller.

Some call centers have multiple supervisors, wherein each supervisor (i) is responsible for supervising a different non-empty subset of the operators, and (ii) bridges only into conversations involving these operators.

The need of the supervisor to continually insert and remove his or her headset's plug can be inconvenient for the supervisors, and can also cause the plugs to break prematurely. In addition, prior art systems generally lack an automated security mechanism to prevent a supervisor from bridging into a conversation for which he/she is not authorized. Therefore, the need exists for a call center apparatus that overcomes these disadvantages.

SUMMARY OF THE INVENTION

The present invention enables a mobile user (i.e., supervisor) to bridge wirelessly into conversations. In particular, the illustrative embodiments automatically bridge the supervisor into the conversation of the closest operator for which the mobile user has bridging authority, thus obviating the need for the supervisor to specify the conversation into which he/she wishes to bridge. The present invention thus overcomes the inconvenience and lack of security inherent in call center systems of the prior art.

The illustrative embodiments are disclosed in the context of telephones and voice conversations; however, it will be clear to those skilled in the art how to make and use variants of the illustrative embodiments for other kinds of terminals (e.g., personal digital assistants (PDAs), etc.) and other modes of communication (e.g., text chat, etc.).

The first illustrative embodiment comprises: a plurality of communications devices, wherein each of the communications devices enables a respective conversation; a communications terminal, wherein the communications terminal is within transmission range of the plurality of communications devices, and is allowed to bridge into authorized conversations, wherein the authorized conversations are enabled by a subset D of the communications devices; and a bridging device for bridging the communications terminal into one of the authorized conversations enabled by one of the communications devices; wherein the bridging device comprises a first transceiver for communicating with the one communications device, and a second transceiver for communicating with the communications terminal; and wherein the one communications device is at least as close to the communications terminal as any other communications device in the subset D.

DETAILED DESCRIPTION

Figure 1A:
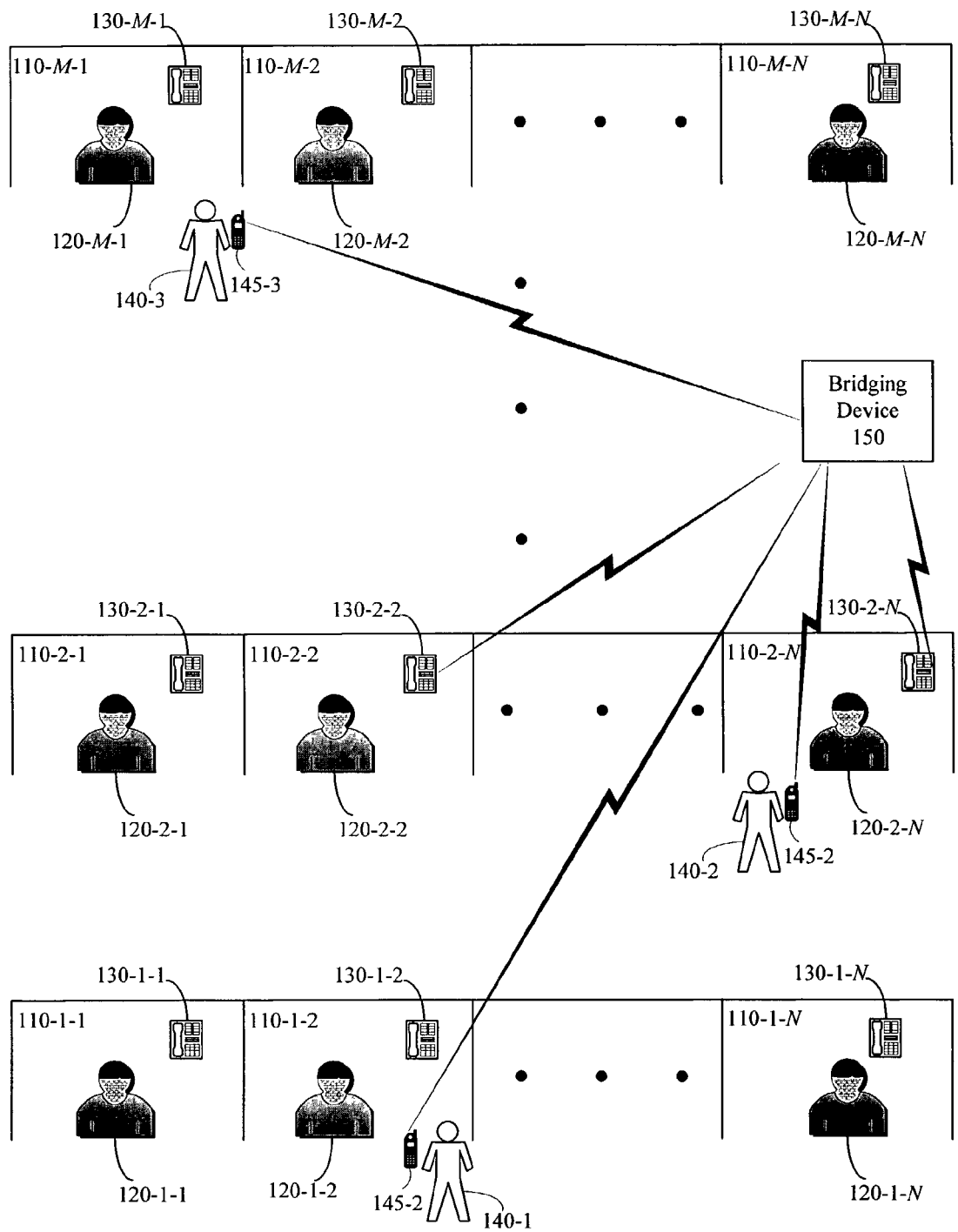
FIG. 1a depicts a block diagram of the salient components of call center 100 in accordance with the first illustrative embodiment of the present invention.

FIG. 1*a* depicts a block diagram of call center 100 in accordance with the first illustrative embodiment of the present invention. As depicted in FIG. 1*a*, call center 100 comprises: M rows of N cubicles 110-1-1 through 110-M-N; M rows of N operators 120-1-1 through 120-M-N; M rows of N operator telephones 130-1-1 through 130-M-N; supervisors 140-1 through 140-3; mobile telephones 145-1 through 145-3; and bridging device 150, interconnected as shown, wherein N and M are positive integers.

Cubicles 110-1-1 through 110-M-N are standard corporate work areas for a single individual.

Operators 120-1-1 through 120-M-N occupy cubicles 110-1-1 through 110-M-N, respectively, and accept telephone calls from callers. Operators 120 typically converse with the callers and/or forward the callers to another person, an automated message center, voice mail, etc.

Operator telephones 130-1-1 through 130-M-N are traditional desktop telephones located in cubicles 110-1-1 through 110-M-N, respectively; it will be clear to those skilled in the art, however, how to make and use embodiments of the present invention in which operator telephones 130 employ a hands-free handset, or are wireless. In addition, it will be clear to those skilled in the art how to make and use embodiments of the present invention in which operator telephones 130 (i) are replaced with communications terminals of another type (e.g., personal digital assistant (PDA), etc.), and/or (ii) employ another mode of communication (e.g., text chat, etc.)

Supervisors 140-1-1 through 140-3 walk around the call center carrying mobile telephones 145-1 through 145-3, respectively, and bridge into operators' conversations via mobile telephone 145, as described below. While FIG. 1 depicts three supervisors 140 for illustrative purposes, it will be clear to those skilled in the art how to make and use embodiments of the present invention that comprise any number of supervisors.

Bridging device 150 communicates wirelessly with operator telephones 130-1-1 through 130-M-N and mobile telephones 145-1 through 145-3, as is well understood in the art. Note that bridging device 150 communicates with all operator telephones 130, even though, for the purpose of clarity, only a subset of these communications are depicted pictorially in FIG. 1*a*. Details of this communication are given below in the description of FIG. 2*a*.

Figure 1B:
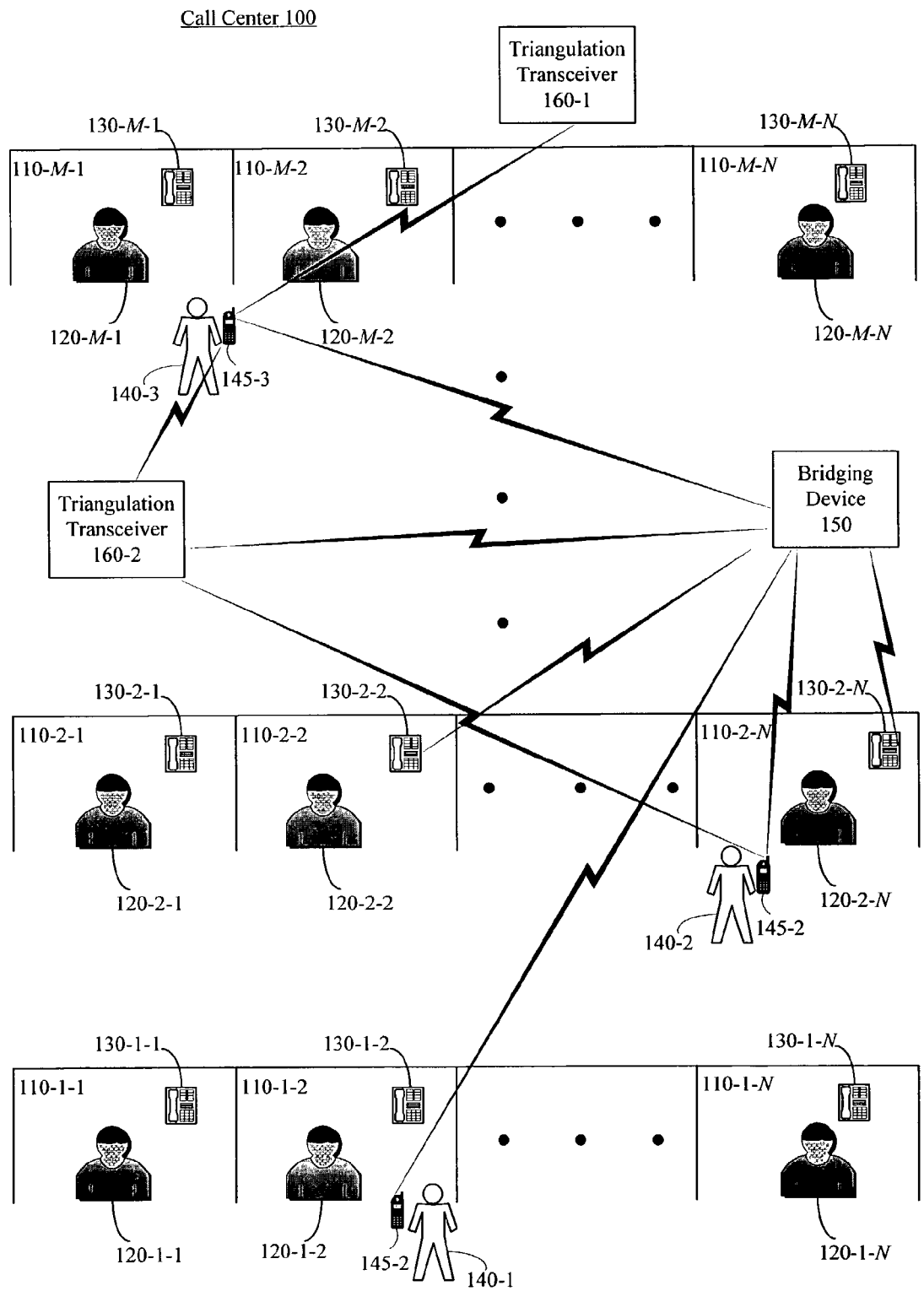
FIG. 1b depicts a block diagram of the salient components of call center 100 in accordance with the second illustrative embodiment of the present invention.

FIG. 1*b* depicts a block diagram of call center 100 in accordance with the second illustrative embodiment of the present invention. As depicted in FIG. 1*b*, call center 100 comprises: M rows of N cubicles 110-1-1 through 110-M-N; M rows of N operators 120-1-1 through 120-M-N; M rows of N operator telephones 130-1-1 through 130-M-N; supervisors 140-1 through 140-3; mobile telephones 145-1 through 145-3; bridging device 150; and triangulation transceivers 160-1 and 160-2, interconnected as shown, wherein N and M are positive integers.

As can be seen by comparing FIG. 1*a* and FIG. 1*b*, the second illustrative embodiment is the same as the first illustrative embodiment except for the addition of triangulation transceivers 160-1 and 160-2. Triangulation transceivers 160-1 and 160-2 communicate wirelessly with mobile telephones 145-1 through 145-3 and with bridging device 150. As discussed below in the description of FIG. 2*b*, each triangulation transceiver 160-*i* receives signals from each mobile telephone 145-*j* and sends information to bridging device 150 to allow the computation of the mobile telephones' locations. While FIG. 1*b* depicts two triangulation transceivers 160 for illustrative purposes, it will be clear to those skilled in the art how to make and use embodiments of the present invention that comprise some other number of triangulation transceivers. In addition, as in FIG. 1*a*, only a subset of communications between bridging device 150 and operator telephones 130 are depicted in FIG. 1*b*.

Figure 1C:
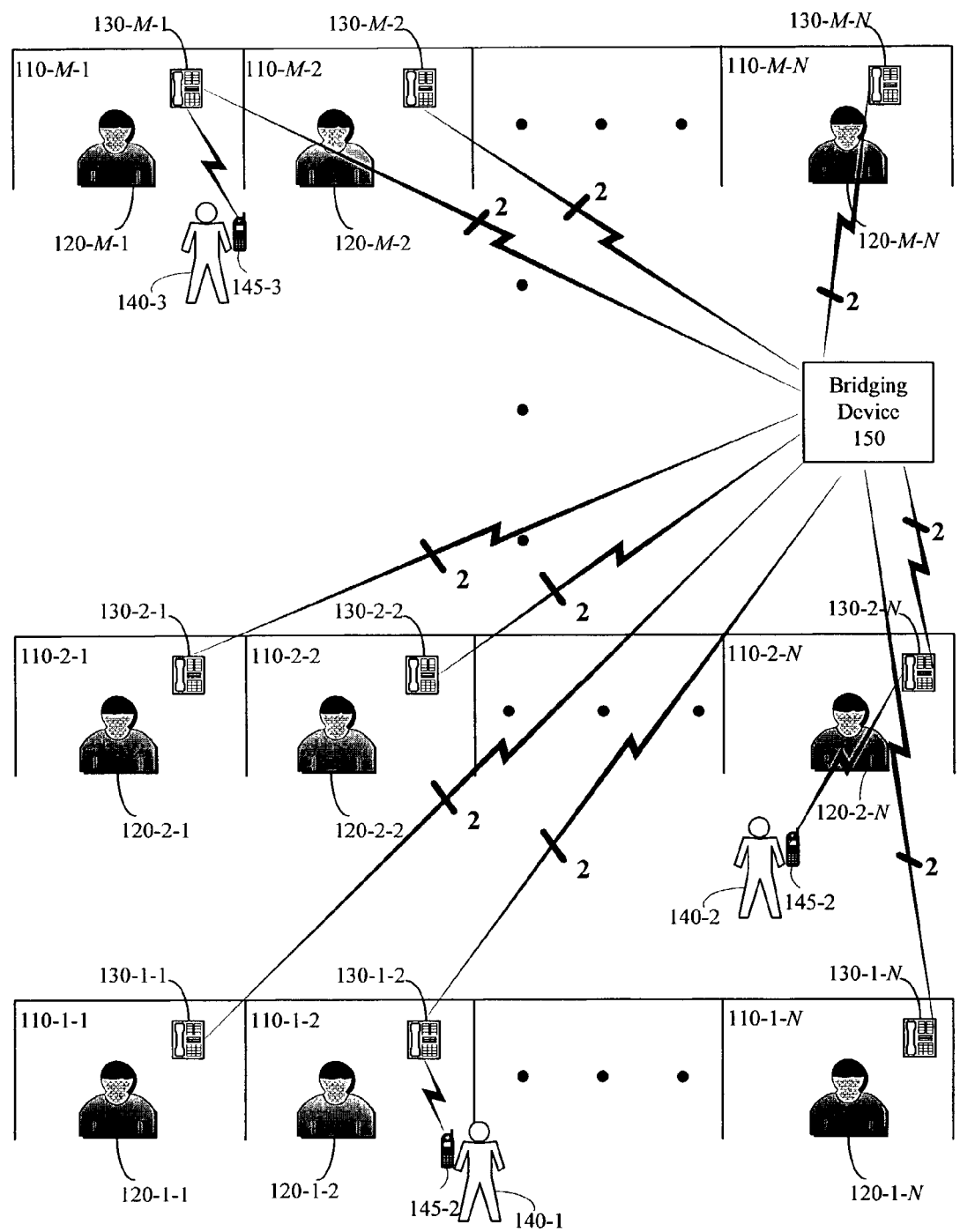
FIG. 1c depicts a block diagram of the salient components of call center 100 in accordance with the third illustrative embodiment of the present invention.

FIG. 1*c* depicts a block diagram of call center 100 in accordance with the third illustrative embodiment of the present invention. As depicted in FIG. 1*c*, call center 100 comprises: M rows of N cubicles 110-1-1 through 110-M-N; M rows of N operators 120-1-1 through 120-M-N; M rows of N operator telephones 130-1-1 through 130-M-N; supervisors 140-1 through 140-3; mobile telephones 145-1 through 145-3; and bridging device 150, interconnected as shown, wherein N and M are positive integers.

As can be seen by comparing FIG. 1*a* and FIG. 1*c*, the third illustrative embodiment is the same as the first illustrative embodiment, except for (i) the manner in which mobile telephones 145 communicate with bridging device 150, and (ii) the manner in which operator telephones 130 communicate with bridging device 150. Instead of communicating directly with bridging device 150, as in the first and second embodiments, mobile telephone 145 communicates with bridging device 150 via one of operator telephones 130. The particular mechanism by which this occurs is disclosed below in the descriptions of FIG. 3*c* and FIG. 4. In addition, as depicted in FIG. 1*c*, each operator telephone 130 communicates with bridging device 150 via two separate bi-directional logical channels. (Note that these channels are logical, and thus might share a single physical channel.) Details on these communications are also disclosed below in the descriptions of FIG. 3*c* and FIG. 4.

Figure 2A:
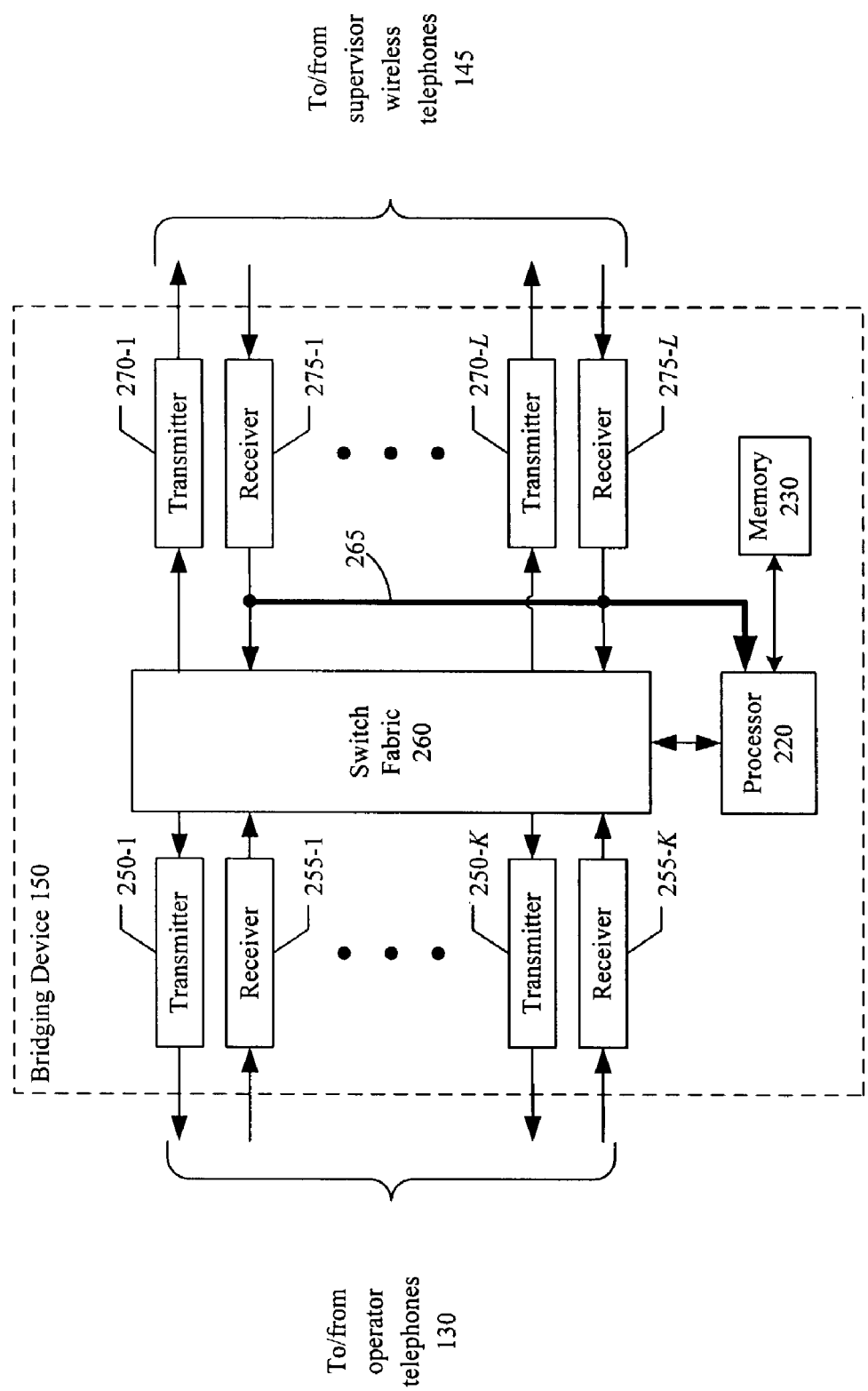
FIG. 2a depicts a block diagram of the salient components of bridging device 150, as shown in FIG. 1a, in accordance with the first illustrative embodiment of the present invention.

FIG. 2*a* depicts a block diagram of the salient components of bridging device 150 in accordance with the first illustrative embodiment of the present invention. As shown in FIG. 2*a*, bridging device 150 comprises: switch fabric 260; bus 265; processor 220; K pairs of transmitters and receivers—transmitters 250-1 through 250-K and receivers 255-1 through 255-K; and L pairs of transmitters and receivers—transmitters 270-*l* through 270-L and receivers 275-1 through 275-L; interconnected as shown, wherein K and L are positive integers.

Transmitter 250-*k*, for k=1 to K, comprises the circuitry that enables bridging device 150 to transmit information-bearing electromagnetic signals to operator telephones 130-1-1 through 130-M-N, where at any given time each transmitter 250-*i* transmits to at most one operator telephone 130. It will be clear to those skilled in the art how to make and use transmitter 250-*k*.

Receiver 255-*k*, for k=1 to K, comprises the circuitry that enables bridging device 150 to receive information-bearing electromagnetic signals from operator telephones 130-1-1 through 130-M-N, where at any given time each receiver 255-*k* receives from at most one operator telephone 130. It will be clear to those skilled in the art how to make and use receiver 255-*k*.

For k=1 to K, at any given time, transmitter 250-*k* transmits signals to operator telephone 130-*m-n* if and only if receiver 255-*k* receives signals from operator telephone 130-*m-n*, where m is an integer between 1 and M and n is an integer between 1 and N.

Transmitter 270-*l*, for l=1 to L, comprises the circuitry that enables bridging device 150 to transmit information-bearing electromagnetic signals wirelessly to supervisor mobile telephones 145, where at any given time each transmitter 270-*i* transmits to at most one mobile telephone 145. It will be clear to those skilled in the art how to make and use transmitter 270-*l*.

Receiver 275-*l*, for l=1 to L, comprises the circuitry that enables bridging device 150 to receive information-bearing electromagnetic signals wirelessly from supervisor mobile telephones 145, where at any given time each receiver 275-*l* receives from at most one mobile telephone 145-*i*. In this first illustrative embodiment, each mobile telephone 145 has a global positioning system (GPS) receiver that determines its location from satellite-based signals, as is well understood in the art, and transmits this location to receiver 275-*l* via said information-bearing electromagnetic signals. Receivers 275-*l* send these physical location data to processor 220 via bus 265. It will be clear to those skilled in the art how to make and use receiver 275-*l* and bus 265.

For l=1 to L, at any given time, transmitter 270-*i* transmits signals to supervisor mobile telephone 145-*i* if and only if receiver 275-*l* receives signals from mobile telephone 145-*i*, where i is an integer between 1 and the number of supervisors (3 in the first illustrative embodiment shown in FIG. 1*a*).

Switch fabric 260 enables bridging device 150 to establish a communication path between any transmitter-receiver pair 250-*k*/255-*k* and any transmitter-receiver pair 270-*l*/275-*l*, thereby bridging (i) the mobile telephone 145-*i* that is communicating with transmitter-receiver pair 270-*l*/275-*l* into (ii) the conversation on the operator telephone 130-*m*-*n* that is communicating with transmitter-receiver pair 250-*k*/255-*k*. Switch fabric 260 configures its connections between transmitter-receiver pairs in response to signals from processor 220, as described below. It will be clear to those skilled in the art how to make and use switch fabric 260.

Memory 230 stores a list of the physical locations (e.g., coordinates, etc.) of each of operator telephones 130-*m*-*n*. In the illustrative embodiments, operators 110-*m*-*n* and operator telephones 130-*m*-*n* are at fixed locations; consequently, memory 230 could instead store a list of the physical locations of the center of each cubicle 110-*m*-*n*.

In alternative embodiments, operator telephones 130 could be mobile terminals. In such embodiments, the information-bearing electromagnetic signals received by receiver 255-*l* from corresponding operator telephone 130-*m*-*n* also include the physical location of operator telephone 130-*m*-*n*. Based on these signals, memory 230 could be dynamically updated to reflect the current positions of each operator telephone 130-*m*-*n*.

Memory 230 also stores a list for each mobile telephone 145-*i* that indicates the operator telephones 130 over which the mobile telephone's corresponding supervisor 140-*i* has bridging authority. It will be clear to those skilled in the art how to make and use memory 230.

Processor 220 is a programmed general-purpose processor; it will be clear to those skilled in the art, however, after reading this specification, how to make and use alternative embodiments of the present invention in which processor 220 is a "hard-wired" or special-purpose processor. As is detailed below in the description of FIG. 3*a*, processor 220 configures switch fabric 260 to bridge mobile telephones 145 into the appropriate respective conversations.

Figure 2B:
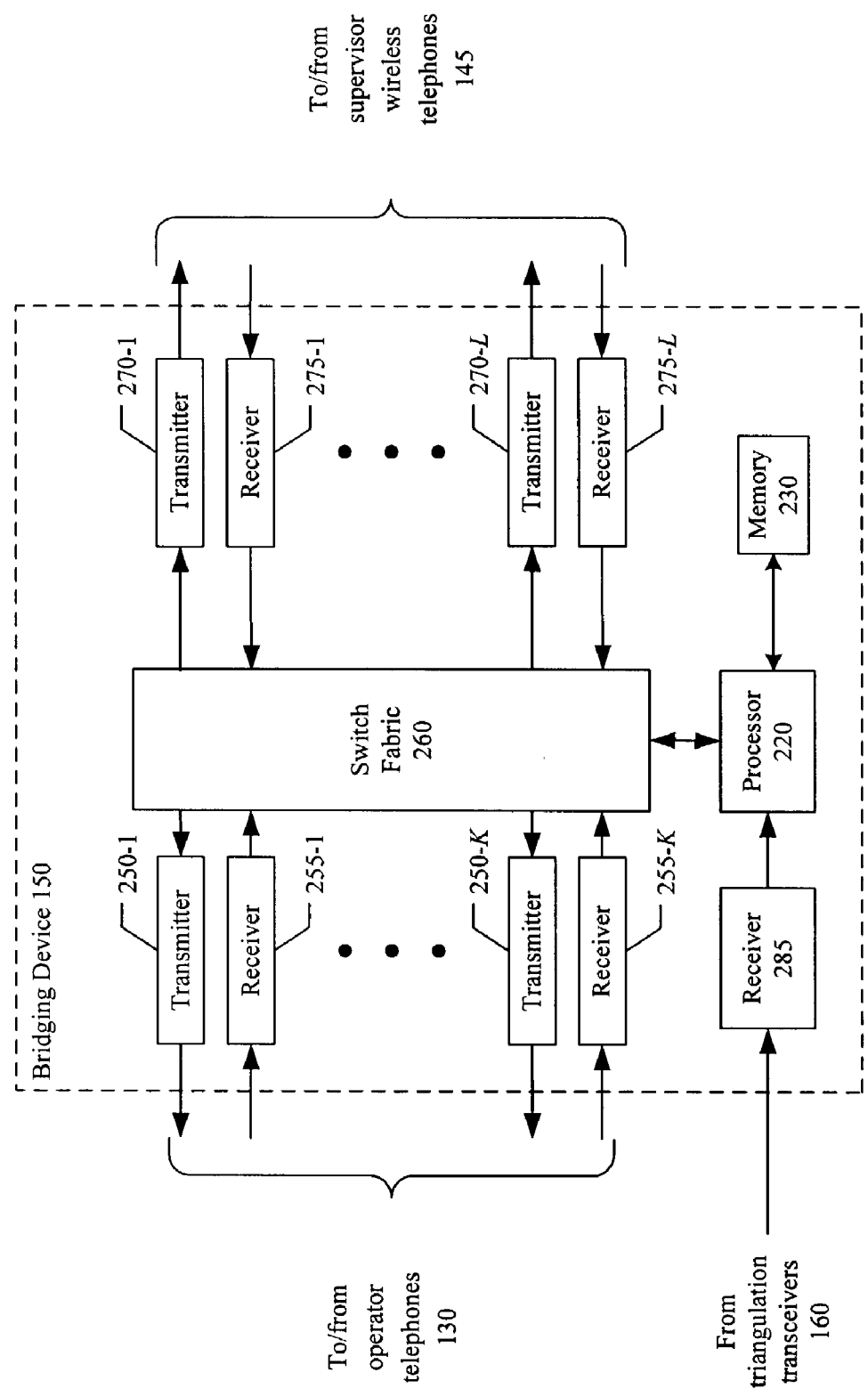
FIG. 2b depicts a block diagram of the salient components of bridging device 150, as shown in FIG. 1b, in accordance with the second illustrative embodiment of the present invention.

FIG. 2*b* depicts a block diagram of the salient components of bridging device 150 in accordance with the second illustrative embodiment of the present invention. As shown in FIG. 2*b*, bridging device 150 comprises: switch fabric 260; processor 220; K pairs of transmitters and receivers—transmitters 250-1 through 250-K and receivers 255-1 through 255-K; L pairs of transmitters and receivers—transmitters 270-1 through 270-L and receivers 275-1 through 275-L; and receiver 285; interconnected as shown, wherein K and L are positive integers.

As can be seen by comparing FIG. 2*a* and FIG. 2*b*, the second illustrative embodiment of bridging device 150 is the same as the first illustrative embodiment except for (i) the addition receiver 285, and (ii) the absence of bus 265. In this second illustrative embodiment, mobile telephones 145 do not have a GPS receiver for relaying the mobile telephones' position to bridging device 150. Instead, each triangulation transceiver 160 receives the same information-bearing wireless signals as bridging receiver 150 from mobile telephones 145. As is well understood in the art, receiving the same signals at bridging device 150 and triangulation transceivers 160 permits the computation of each mobile telephone 145's location. In some embodiments, the computations are base on the delays of the signals' arrival at triangulation transceivers 160, while in other embodiments the computations are based on phase angle, as is well understood in the art.

Each triangulation transceiver 160 wirelessly transmits the appropriate time delay and/or phase angle information to bridging device 150. Receiver 285 receives this information and feeds it to processor 220, which, as described below, performs the necessary computations for determining the locations of mobile telephones 145.

Figure 2C:
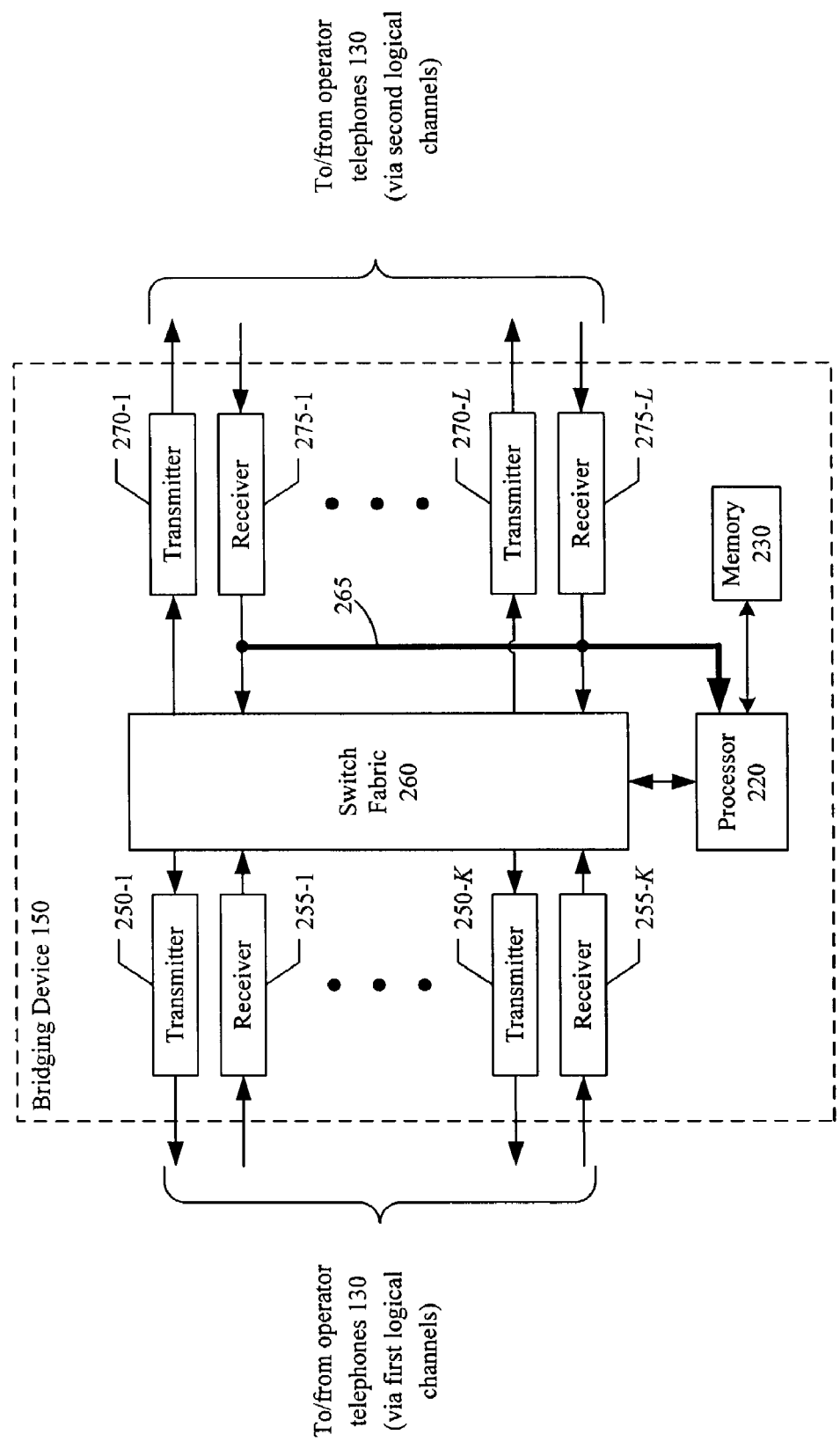
FIG. 2c depicts a block diagram of the salient components of bridging device 150, as shown in FIG. 1c, in accordance with the third illustrative embodiment of the present invention.

FIG. 2*c* depicts a block diagram of the salient components of bridging device 150 in accordance with the third illustrative embodiment of the present invention. As shown in FIG. 2*c*, bridging device 150 comprises: switch fabric 260; bus 265; processor 220; K pairs of transmitters and receivers—transmitters 250-1 through 250-K and receivers 255-1 through 255-K; and L pairs of transmitters and receivers—transmitters 270-1 through 270-L and receivers 275-1 through 275-L; interconnected as shown, wherein K and L are positive integers.

As can be seen by comparing FIG. 2*a* and FIG. 2*c*, the third illustrative embodiment of bridging device 150 is the same as the first illustrative embodiment, except that: (i) receiver/transmitter pairs 250/255 communicate with operator telephones 130 via respective first logical channels; and (ii) receiver/transmitter pairs 270/275 communicate with operator telephones 130 instead of mobile telephones 145 (via respective second logical channels). Details concerning (i) and (ii) are disclosed below in the descriptions of FIG. 3*c* and FIG. 4.

Figure 3A:
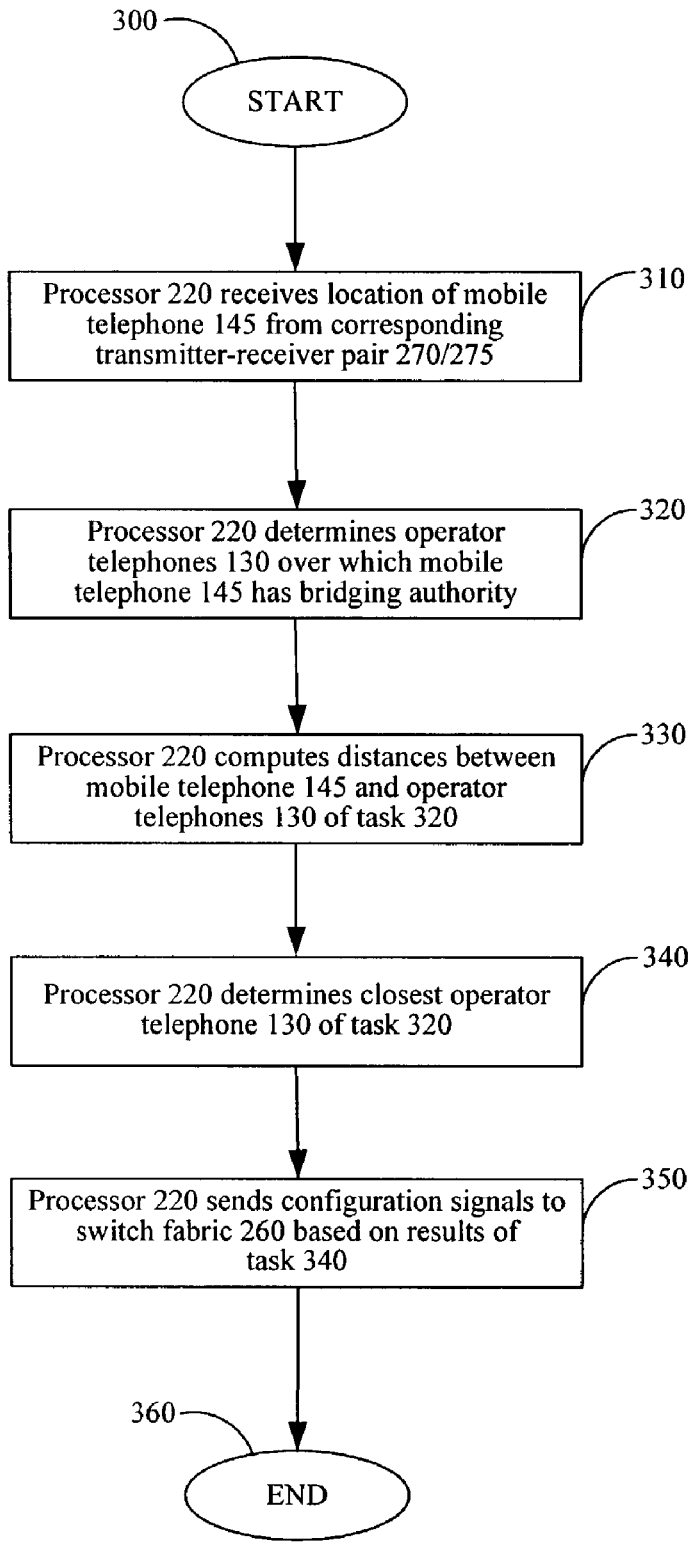
FIG. 3a depicts a flowchart of the operation of processor 220, as shown in FIG. 2a, in accordance with the first illustrative embodiment of the present invention.

FIG. 3*a* depicts a flowchart of the operation of processor 220 according to the first illustrative embodiment of the present invention.

At task 310, processor 220 receives signals from each transmitter-receiver pair 270-*l*/275-*l* via bus 265 that indicate the location of the mobile telephone 145-*i* that communicates with 270-*l*/275-*l*.

At task 320, processor 220 reads from memory 230 to determine over which operator telephones 130-*m*-*n* mobile telephone 145-*i*'s corresponding supervisor 140-*i* has bridging authority.

At task 330, processor 220 computes the distances between each mobile telephone 145-*i* and the corresponding candidate operator telephones 130-*m*-*n*.

At task 340, processor 220 determines the closest candidate operator telephone 130-*m*-*n*.

At task 350, processor 220 sends configuration signals to switch fabric 260 to connect pairs 250-*k*/255-*k* and 270-*l*/275-*l* based on the results of task 340.

Figure 3B:
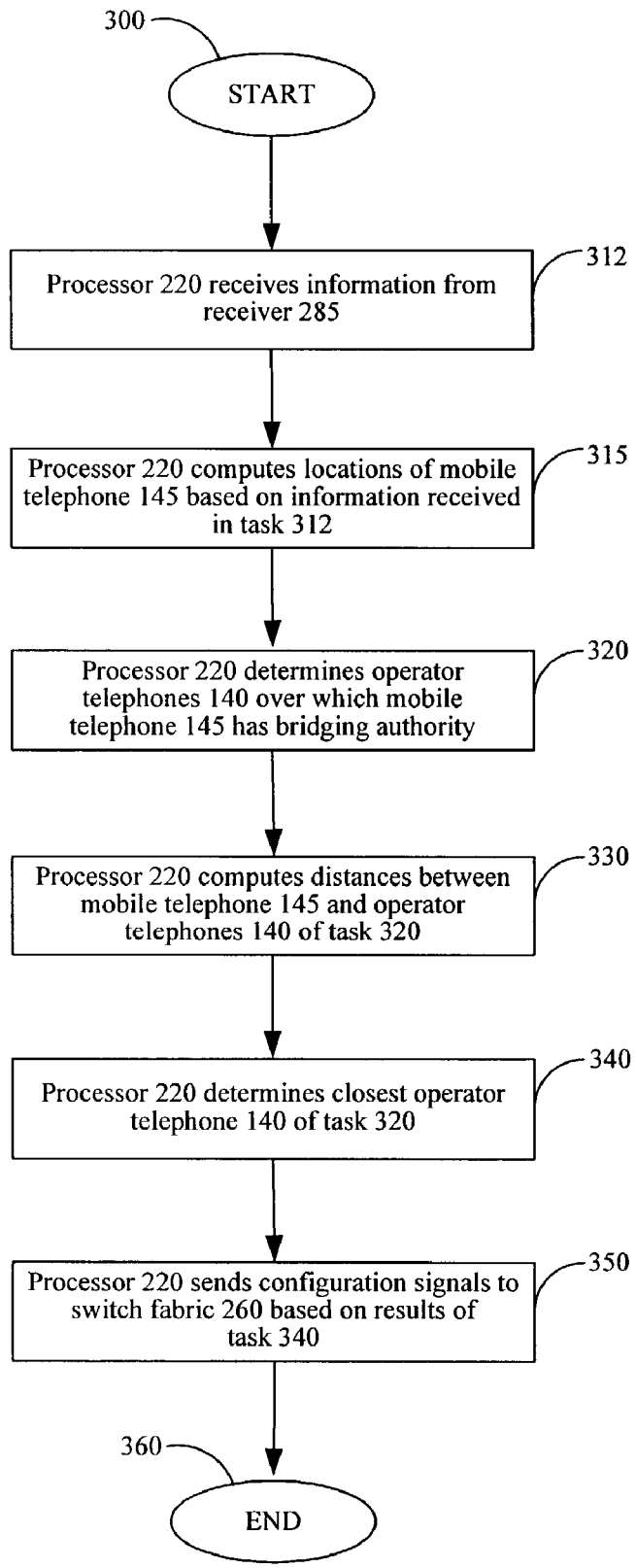
FIG. 3b depicts a flowchart of the operation of processor 220, as shown in FIG. 2b, in accordance with the second illustrative embodiment of the present invention.

FIG. 3*b* depicts a flowchart of the operation of processor 220 according to the second illustrative embodiment of the present invention. As can be seen by comparing FIG. 3*a* and FIG. 3b, the flowchart of the second illustrative embodiment is the same as for the first illustrative embodiment except for the replacement of task 310 with tasks 312 and 315.

At task 312, processor 220 receives raw location data (e.g., time delay, phase angle, etc.) from receiver 285.

At task 315, processor 220 computes the locations of mobile telephones 145 based on the raw location data received in task 312.

At task 320, processor 220 reads from memory 230 to determine over which operator telephones 130-*m-n* mobile telephone 145-*i*'s corresponding supervisor 140-*i* has bridging authority.

At task 330, processor 220 computes the distances between each mobile telephone 145-*i* and the corresponding candidate operator telephones 130-*m-n*.

At task 340, processor 220 determines the closest candidate operator telephone 130-*m-n*.

At task 350, processor 220 sends configuration signals to switch fabric 260 to connect pairs 250-*k*/255-*k* and 270-*l*/275-*l* based on the results of task 340.

Figure 3C:
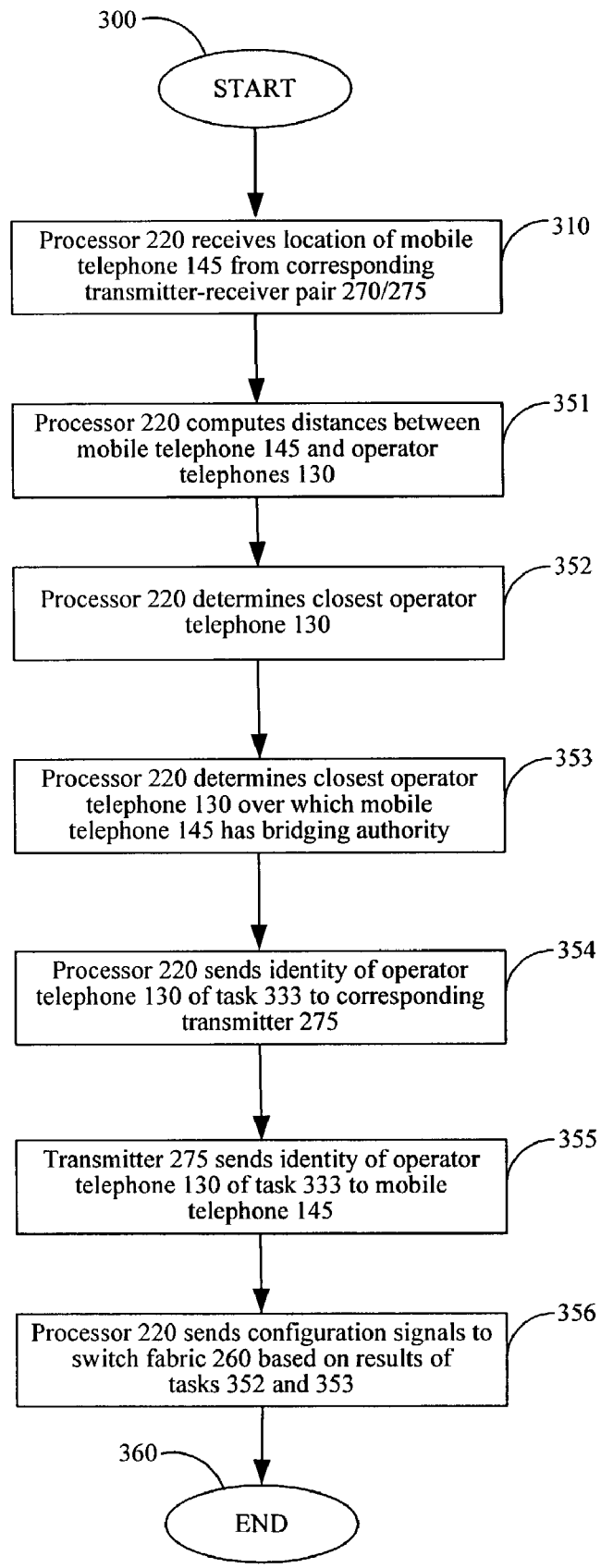
FIG. 3c depicts a flowchart of the operation of processor 220, as shown in FIG. 2c, in accordance with the third illustrative embodiment of the present invention.

FIG. 3c depicts a flowchart of the operation of processor 220 according to the third illustrative embodiment of the present invention.

At task 310, processor 220 receives signals from each transmitter-receiver pair 270-*l*/275-*l* via bus 265 that indicate the location of the mobile telephone 145-*i* that communicates with 270-*l*/275-*l*.

At task 351, processor 220 computes the distances between mobile telephone 145-*i* and each operator telephone 130-*m-n*.

At task 352, processor 220 determines the closest operator telephone 130-*m-n* based on the results of task 351.

At task 353, processor 220 determines the closest operator telephone 130-*m-n* over which mobile telephone 145-*i*'s corresponding supervisor 140-*i* has bridging authority. This determination is straightforward based on (i) the results of task 351, and (ii) lookups of authorization tables stored in memory 230. Note that the operator telephones 130 selected by tasks 352 and 353 might or might not be the same, depending on the supervisor 140-*i*'s bridging authority.

At task 354, processor 220 sends the identity of the operator telephone 130-*m-n* of task 352 (i.e., the operator telephone closest to mobile telephone 145-*i*) to corresponding transmitter 275-*l* via bus 265.

At task 355, transmitter 275-*l* sends the identity of operator telephone 130-*m-n* of task 352 to mobile telephone 145-*i*, thus informing mobile telephone 145-*i* to which operator telephone 130 signals should be transmitted during bridging.

At task 356, processor 220 sends configuration signals to switch fabric 260 to connect pairs 250-*k*/255-*k* and 270-*l*/275-*l* based on the results of tasks 352 and 353.

Figure 4:
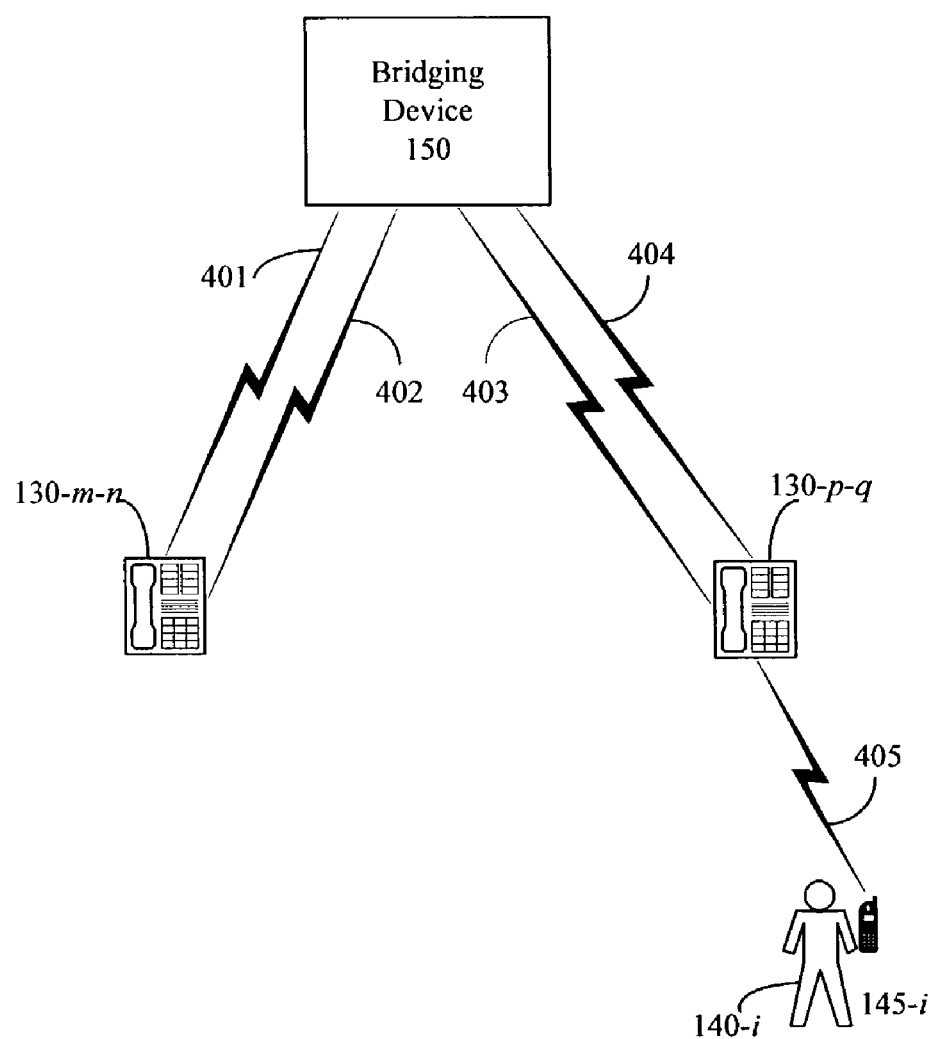
FIG. 4 depicts a diagram of a bridging communication path between mobile telephone 145-i, as shown in FIG. 1c, and operator telephone 130-*m-n*, as shown in FIG. 1*c*, in accordance with the third illustrative embodiment of the present invention.

FIG. 4 depicts a diagram of a bridging communication path between mobile telephone 145-*i* and operator telephone 130-*m-n* in accordance with the third illustrative embodiment of the present invention. Operator telephone 130-*m-n* is the closest operator telephone over which mobile telephone 145-*i*'s corresponding supervisor 140-*i* has bridging authority, where m is an integer between 1 and M and n is an integer between 1 and N. Operator telephone 130-*p-q* is the operator telephone closest to mobile telephone 145-*i*'s, regardless of bridging authority, where p is an integer between 1 and M and q is an integer between 1 and N. Note that in some cases operator telephone 130-*m-n* and operator telephone 130-*p-q* might be the same (i.e., p=m and q=n).

Conversation signals from operator telephone 130-*m-n* are transmitted over 130-*m-n*'s first logical channel 401 to bridging device 150. Bridging device 150 switches these signals, as described above, and transmits these signals to operator telephone 130-*p-q* over 130-*p-q*'s second (i.e., bridging) logical channel 404. Operator telephone 130-*p-q* forwards these signals to mobile telephone 145-*i* over wireless link 405.

Similarly, supervisor 140-*i*'s voice signals are transmitted in the opposite direction along the same path; i.e., mobile telephone 145-*i* to operator telephone 130-*p-q* over wireless link 405, operator telephone 130-*p-q* to bridging device 150 over logical channel 404, and bridging device 150 to operator telephone 130-*m-n* over first logical channel 401).

Note that when operator telephone 130-*m-n* and operator telephone 130-*p-q* are different (i.e., p≠m and/or q≠n), operator telephone 130-*m-n*'s second logical channel 402 and operator telephone 130-*p-q*'s first logical channel 403 carry neither (i) telephone 130-*m-n*'s conversation signals, nor (ii) supervisor 140-*i*'s voice signals. Consequently, while supervisor 140-*i* is bridged into operator telephone 130-*m-n*'s conversation, another supervisor 140-j standing near 130-*m-n* could simultaneously bridge into another conversation via second logical channel 402. Similarly, some other supervisor 140-*k* who is standing near another operator telephone (say, 130-*r-s*) could simultaneously bridge into operator telephone 130-*p-q*'s conversation via first logical channel 403.

In some embodiments mobile telephone 145 has an input facility (e.g., keypad button, toggle switch, etc.) for activating and/or deactivating bridging. When mobile telephone 145's user (i.e., supervisor) activates bridging, mobile telephone 145 transmits an activation signal to bridging device 150 (and to triangulation transceivers 160 in the second illustrative embodiment). When mobile telephone 145's user deactivates bridging, mobile telephone 145 notifies bridging device 150 (and triangulation transceivers 160 in the second illustrative embodiment) either by (i) transmitting a deactivation signal, or by (ii) stopping all transmissions.

In the first and third illustrative embodiments, when receiver 275-*l* detects a deactivation, it sends a deactivation signal to processor 220 via bus 265; in response, processor 220 configures switching fabric 260 to terminate (e.g., block, etc.) the corresponding bridging connection. Similarly, in the second illustrative embodiment, when receiver 285 detects a deactivation it sends a deactivation signal to processor 220, and processor 220 configures switching fabric 260 to terminate the corresponding bridging connection.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
    receiving a first signal from a wireless communications terminal W that is in the vicinity of a plurality of communications terminals, wherein each of said plurality of communications terminals enables a respective conversation, and wherein said wireless communications terminal W is authorized to bridge into a non-empty subset C of said conversations; and
    bridging said wireless communications terminal W into the conversation z of said subset C whose communications terminal is closest to W.

2. The method of claim 1 wherein said plurality of communications terminals are at fixed locations.

3. The method of claim 1 wherein said plurality of communications terminals are attended by call center operators.

4. The method of claim 1 wherein another wireless communications terminal V that is in the vicinity of said plurality of communications terminals is already bridged into said conversation z when said wireless communications terminal W is bridged into said conversation z.

5. The method of claim 1 wherein another wireless communications terminal V that is in the vicinity of said plurality of communications terminals is already bridged into one of said conversations other than z.

6. The method of claim 1 further comprising:

receiving a second signal from said wireless communications terminal W; and dropping said wireless communications terminal W from said conversation z.

7. The method of claim 1 further comprising:

receiving a second signal from a wireless communications terminal V that is in the vicinity of said plurality of communications terminals, wherein said wireless communications terminal V is authorized to bridge into a non-empty subset D of said conversations; and bridging said wireless communications terminal V into the conversation of said subset D whose communications terminal is closest to V.

8. The method of claim 1 further comprising:

receiving a second signal from a wireless communications terminal V that is in the vicinity of said plurality of communications terminals, wherein said wireless communications terminal V is authorized to bridge into a non-empty subset D of said conversations that includes z; and when the communications terminal that enables said conversation z is closer to V than any other of the communications terminals that enable conversations of said subset D, bridging said wireless communications terminal W into said conversation z.

9. The method of claim 8 further comprising:

receiving a third signal from said wireless communications terminal V; and dropping said wireless communications terminal V from said conversation z.

10. The method of claim 8 further comprising:

receiving a third signal from said wireless communications terminal W; and dropping said wireless communications terminal W from said conversation z.

11. The method of claim 1 further comprising:

receiving a second signal from a wireless communications terminal V that is in the vicinity of said plurality of communications terminals, wherein said wireless communications terminal V is authorized to bridge into a non-empty subset D of said conversations that includes z; and when the communications terminal that enables said conversation z is closer to V than any other of the communications terminals that enable conversations of said subset D, bridging said wireless communications terminal W into the conversation of said subset D whose communications terminal is second closest to W.

* * * * *